(12) United States Patent
Rae et al.

(10) Patent No.: US 7,496,345 B1
(45) Date of Patent: Feb. 24, 2009

(54) SYSTEMS AND METHODS FOR PROCESSING CALLS DIRECTED TO TELEPHONES HAVING A PORTABLE INTERFACE

(75) Inventors: Robert L. Rae, Plano, TX (US);
Michelle L. Davis, Plano, TX (US);
James E. King, Little Elm, TX (US);
Luke Keiser, Frisco, TX (US)

(73) Assignee: Evercom Systems, Inc., Dallas, TX (US)

( * ) Notice: Subject to any disclaimer, the term of this patent is extended or adjusted under 35 U.S.C. 154(b) by 467 days.

(21) Appl. No.: 10/954,935

(22) Filed: Sep. 30, 2004

(51) Int. Cl.
*H04M 11/00* (2006.01)

(52) U.S. Cl. .............. 455/406; 379/114.29; 379/188; 379/343

(58) Field of Classification Search .............. 455/414, 455/1, 404.2, 406, 407, 408, 414.3, 414.4, 455/417, 432.1, 433, 435.1, 456.3, 456.5, 455/456.6, 457, 558; 379/114.29, 188, 343; 705/75; 375/343
See application file for complete search history.

(56) References Cited

U.S. PATENT DOCUMENTS

| | | | |
|---|---|---|---|
| 4,935,956 A | 6/1990 | Hellwarth et al. | |
| 4,993,062 A | 2/1991 | Dula et al. | |
| 5,247,569 A | 9/1993 | Cave | |
| 5,255,305 A | 10/1993 | Sattar | |
| 6,320,946 B1 | 11/2001 | Enzmann et al. | |
| 6,324,280 B2 | 11/2001 | Dunn et al. | |
| 6,363,065 B1 | 3/2002 | Thornton et al. | |
| 6,404,764 B1 | 6/2002 | Jones et al. | |
| 6,404,857 B1 | 6/2002 | Blair et al. | |
| 6,480,590 B1 | 11/2002 | Ku | |
| 6,487,200 B1 | 11/2002 | Fraser | |

(Continued)

FOREIGN PATENT DOCUMENTS

EP 1175074 A2 1/2002

(Continued)

OTHER PUBLICATIONS

Bobb Swope, et al., U.S. Appl. No. 09/640,831, Entitled "System and Method for Reverse Billing for Telephone Call," Filed Aug. 17, 2000. (Reference not included).

(Continued)

*Primary Examiner*—Duc Nguyen
*Assistant Examiner*—Wayne Cai
(74) *Attorney, Agent, or Firm*—Sinter & Matsil, L.L.P.

(57) ABSTRACT

Disclosed are systems and methods which provide for processing of calls by determining when a called number is associated with telephone having a portable interface and providing call processing adapted for addressing issues associated with a portable interface. Call processing may provide for point of demand processing of calls to facilitate completion of calls in real-time, even when such calls are directed to a wireless telephone, a telephone for which LNP has been utilized, or other telephone having a portable interface. If an appropriate relationship has not been already been established for facilitating a call to a telephone having a portable interface, embodiments operate to establish such a relationship. When it is determined that a called number is associated with telephone having a portable interface, embodiments operate to invoke rating schemes appropriate to the called number, possibly including flat rate schemes and rating determined using current location determination.

78 Claims, 3 Drawing Sheets

U.S. PATENT DOCUMENTS

| | | | |
|---|---|---|---|
| 6,553,336 | B1 | 4/2003 | Johnson et al. |
| 6,606,377 | B2* | 8/2003 | Ruckart et al. .......... 379/121.02 |
| 6,697,469 | B1* | 2/2004 | Koster ................... 379/114.29 |
| 6,795,545 | B1* | 9/2004 | Addicks ................ 379/220.01 |
| 6,920,209 | B1 | 7/2005 | Gainsboro |
| 7,068,742 | B2* | 6/2006 | Yousef et al. ................ 375/343 |
| 2002/0071537 | A1* | 6/2002 | Gainsboro ................... 379/188 |
| 2002/0176403 | A1 | 11/2002 | Radian |
| 2002/0197989 | A1* | 12/2002 | Cruder et al. ................ 455/426 |
| 2003/0002639 | A1 | 1/2003 | Huie |
| 2003/0114142 | A1* | 6/2003 | Brown et al. ................ 455/408 |
| 2003/0126470 | A1* | 7/2003 | Crites et al. .................. 713/201 |
| 2003/0185204 | A1 | 10/2003 | Murdock |
| 2003/0198325 | A1* | 10/2003 | Bayne ................... 379/114.21 |
| 2003/0200182 | A1* | 10/2003 | Truitt et al. ..................... 705/75 |
| 2004/0029561 | A1* | 2/2004 | Holter et al. ................. 455/405 |
| 2005/0113064 | A1* | 5/2005 | Halsell ........................ 455/406 |
| 2005/0250537 | A1* | 11/2005 | Narea .......................... 455/558 |
| 2006/0006227 | A1* | 1/2006 | Williams ..................... 235/380 |

FOREIGN PATENT DOCUMENTS

| | | |
|---|---|---|
| JP | 2002157627 | 5/2002 |
| JP | 2003110758 | 4/2003 |

OTHER PUBLICATIONS

Michael Lord, U.S. Appl. No. 09/955,253, Entitled "Method and Apparatus for Exchanging Data Between a Primary Computer System to Ensure Transactional Reconciliation Between the Systems," Filed Nov. 27, 2001 (Reference not included).

Nadia Draizin, et al., U.S. Appl. No. 10/022,946, Entitled "A Method for Determining an Entity Responsible for Billing a Called Party," Filed Dec. 17, 2001. (Reference not included).

John J. Viola, et al., U.S. Appl. No. 10/135,878, Entitled "Information Management and Movement System and Method," Filed Apr. 29, 2002. (Reference not included).

Richard Falcone, et al., U.S. Appl. No. 10/190,315, Entitled "Systems and Methods for Offering a Service to a Party Associated with a Blocked Call," Filed Jul. 3, 2002. (Reference not included).

Michael Lord, U.S. Appl. No. 10/252,956, Entitled "Three-Way Telephone Call Prevention System and Method," Filed Sep. 20, 2002. (Reference not included).

Dick Falcone, et al., U.S. Appl. No. 10/135,883, Entitled "Optimizing Profitability in Business Transactions," Filed Nov. 25, 2003. (Reference not included).

Marc Hite, et al., U.S. Appl. No. 10/437,839, Entitled "Intelligent Queuing of Transaction Records," Filed May 14, 2003. (Reference not included).

Richard Falcone, et al., U.S. Appl. No. 10/360,248, Entitled "Systems and Methods for Account Establishment and Transaction Management Using Interrupt Messaging," Filed Feb. 7, 2003. (Reference not included).

Richard Falcone, et al., U.S. Appl. No. 10/360,442, Entitled "Systems and Methods for Transaction Authorization Determination," Filed Feb. 7, 2003. (Reference not included).

"SciDyn VoIP Technology Now Available for Call Control Solutions," SciDynTM Press Release, [online] [Retrieved on Nov. 4, 2005], Retrieved from: http://www.scidyn.com/news/pr/0122pr.html.

"Call Control—Commander II:," SciDynTM Products, [online] [Retrieved on Nov. 4, 2005], Retrieved from: http://www.scidyn.com/products/cammander2.html.

"Smart Features for Optimizing Your Network," SciDynTM BubbleLink(R), [online] [Retrived on Nov. 4, 2005], Retrieved from: http://www.scidyn.com/products/bubble.html.

"BubbleLink(R) Software Architecture," SciDynTM, The Voice of IP TechnologyTM, [online] [Retrieved on Nov. 4, 2005], Retrieved from: http://www.scidyn.com/products/BubbleLink%20White.pdf.

"ShoreTel-Intelligent Phone Systems," ShoreTel, [online] [Retrieved on Nov. 4, 2005], Retrieved from: http://www.shoretel.com/STCorp/products/architecture.aspx.

\* cited by examiner

SYSTEMS AND METHODS FOR PROCESSING CALLS DIRECTED TO TELEPHONES HAVING A PORTABLE INTERFACE

CROSS-REFERENCE TO RELATED APPLICATIONS

The present application is related to co-pending and commonly assigned U.S. patent application Ser. No. 10/135,878 entitled "Information Management and Movement System and Method," filed Apr. 29, 2002, Ser. No. 10/135,883 entitled "Optimizing Profitability in Business Transactions," filed Apr. 29, 2002, Ser. No. 10/190,315 entitled "System and Methods for Offering a Service to a Party Associated with a Blocked Call," filed Jul. 3, 2002, Ser. No. 10/217,149 entitled "System and Method for Call Treatment," filed Aug. 12, 2002, Ser. No. 10/360,248 entitled "System and Method for Account Establishment and Transaction Management Using Interrupt Messaging," filed Feb. 7, 2003, Ser. No. 10/360,442 entitled "Systems and Methods for Transaction Authorization Determination," filed Feb. 7, 2003, Ser. No. 10/642,532 entitled "Centralized Call Processing," filed Aug. 15, 2003, and Ser. No. 10/720,848 entitled "Information Management and Movement System and Method," filed Nov. 24, 2003, the disclosures of which are hereby incorporated herein by reference.

TECHNICAL FIELD

The present invention relates generally to call processing and, more particularly, to processing calls directed to telephones having a portable interface, including wireless telephones and telephones for which local number portability has been utilized, or for which a suitable billing agreement is not otherwise in place with respect to a service provider.

BACKGROUND OF THE INVENTION

Various call processing systems have been developed over the years to provide automated calling functionality, including call routing, call completion, call monitoring, and call billing. Many such call processing systems benefit from the use of call information obtained from a calling party, a called party, and/or the communication network in order to provide calling functionality as desired. For example, in order to provide automated completion of a collect telephone call (a call for which the charges are reversed to the called party), billing name and number (BNA) information may be obtained from a system coupled to the public switched telephone network (PSTN), such as through the use of a line information database (LIDB). Similarly, rates charged for a long distance call may be determined using dialed number information, such as through use of North American telephone numbering system (NATNS) telephone numbering conventions (e.g., NPA-NXX number analysis).

Call processing systems providing call processing with respect to certain environments may be particularly sensitive to availability/accuracy of one or more aspects of call information. For example, a call processing system providing calling services to a prison facility, or other controlled environment facility (e.g., camp, nursing home, school, hospital, etcetera), may utilize call information to make determinations regarding the propriety of completing a call. Calling services from a prison facility may comprise a prisoner privilege which is closely regulated and monitored, such as to prevent harassing phone calls, fraud, and the commission of crimes. Accordingly, call processing systems providing prison facility calling services may experience increased overhead associated with providing the services and, thus, demand a premium rate.

Changes in the communication network and protocols (e.g., development of a location routing number (LRN) scheme) have introduced issues with respect to information available to call processing systems for use in processing calls. The development of wireless telephones (e.g., cellular, personal communication services (PCS) mobile telephones, or other digital or analog based wireless communication systems) may facilitate arbitrage where rating based upon dialed number information is used. For example, a family member of an inmate may purchase a wireless telephone having a number (NPA-NXX) that is local to a prison in which the inmate is incarcerated. This wireless telephone may be transported to another area, e.g., another state, in which the family member resides, to allow the inmate to make calls to the family member which are charged as local calls. Such a scheme allows the inmate and/or family member to avoid paying rates calculated to compensate the calling service provider for their investment in the specialized equipment and services required in providing calling services to such a facility.

Wireless telephones further present issues with respect to automated completion of collect calls. For example, reversing of charges to a wireless telephone as a called number is typically not permitted by wireless service providers. Moreover, BNA information is typically not available with respect to wireless telephones through typical means, such as the aforementioned LIDB. Accordingly, call processing systems providing call processing with respect to certain environments, such as a prison facility, may be unable to obtain useful call information, such as to determine if the dialed number is associated with an individual the calling party is to be prevented from calling (e.g., harassing phone call to a victim or judge).

Local number portability (LNP) also presents issues with respect to information available to call processing systems for use in processing calls. For example, a prepaid account may be established for calls placed to a particular wireline telephone number and a call rate established for calls placed to that telephone number based upon location. Additionally, a payment history may be established with respect to the telephone number, and therefore a call processing system may relax or omit one or more validation operations when calls are placed to that telephone number. However, with LNP, that telephone number may be subsequently utilized at a different location and/or with a different service (e.g., wireless rather than wireline service). Such a change may incur a different rate and/or involve different restrictions (e.g., preventing calls placed to particular locations or using particular services) which may remain unrealized where the call processing system relies on the dialed number.

BRIEF SUMMARY OF THE INVENTION

The present invention is directed to systems and methods which provide for processing of calls by determining when a called number is associated with telephone having a portable interface (e.g., a wireless telephone which itself is transportable, a telephone for which the telephone number has been ported to a different location and/or service using local number portability (LNP), etcetera) and providing call processing adapted for addressing issues associated with a portable interface. Call processing according to preferred embodiments of the present invention provide for point of demand processing of calls to facilitate completion of calls in real-time, even when such calls are directed to a wireless telephone, a telephone for which LNP has been utilized, or other telephone having a portable interface. Additionally or alternatively, call processing according to embodiments of the invention provide for point of demand processing of calls to facilitate completion of calls in real-time when a call is placed to any destination terminal for which the service provider does not have a direct billing agreement in place, such as where the destination terminal comprises an Internet phone or is served by a competitive local exchange carrier (CLEC).

Embodiments of the invention operate to intervene in a call at the point of demand to determine if the call is directed toward a telephone having a portable interface. If an appropriate relationship has not been established a priori for facilitating a call to a telephone having a portable interface, embodiments of the invention operate to establish such a relationship (e.g., by connecting the caller to a customer service representative and/or using an automated interactive voice response (IVR) unit) to thereby facilitate completion of the call. For example, although billing name and address (BNA) information may not be available for a called wireless telephone, embodiments of the present invention operate to establish a prepaid relationship, perhaps just for the current call, to facilitate completion of a call to the wireless telephone at the point of demand. Additionally or alternatively, arrangements maybe made with appropriate carriers (e.g., a wireless carrier serving a called wireless telephone) to facilitate post-billing a called party. Accordingly, calls may be serviced by call processing systems operating in accordance with the present invention which otherwise may not have been served due to the called telephone being a wireless telephone, because a called telephone number has been ported from a wireline telephone to a wireless telephone, etcetera.

Embodiments of the present invention, when it is determined that a called number is associated with telephone having a portable interface, operate to invoke rating schemes appropriate to the called number and/or portable interface. For example, where the called number is associated with a wireless telephone or a telephone for which LNP has been utilized, a current location determination may be made to apply an appropriate rate for the call. Additionally or alternatively, a location independent rate, such as a flat rate for wireless telephone calls, may be utilized. Selection between various rating schemes may be made based upon such information as the tariff in the state, any relationship the calling service provider has with the carrier or carriers being used, etcetera. Such rating schemes may be employed to prevent arbitrage, such as where calling services are provided at a higher rate for a particular market (e.g., calling services for a controlled environment facility).

Current location determinations according to embodiments of the invention may be based upon one or more information sources. For example, network elements (e.g., signaling system seven (SS7) network elements, databases, home location registers (HLR), visiting location registers (VLR), etcetera) may be queried to determine the location of a called telephone, such as by identifying a terminating network element and/or querying HLRs and/or VLRs. Additionally or alternatively, telephone locating infrastructure, such as enhanced 911 (E911) emergency locating systems or third party location systems which monitor communications to make location determinations, may be utilized, such as by placing a commercial query to an E911 or third party system. The foregoing third party location systems may provide location services through such techniques as collocating with a wireless carrier's base transceiver station (BTS) tower site and directly connecting with the carrier and/or scanning wireless signals in the area for information for making location determinations.

Current location information may be utilized according to embodiments of the present invention for applications in addition to or in the alternative to rating a call. For example, current location information may be particularly useful in investigative applications where calling services are provided in association with a prison facility.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1A:
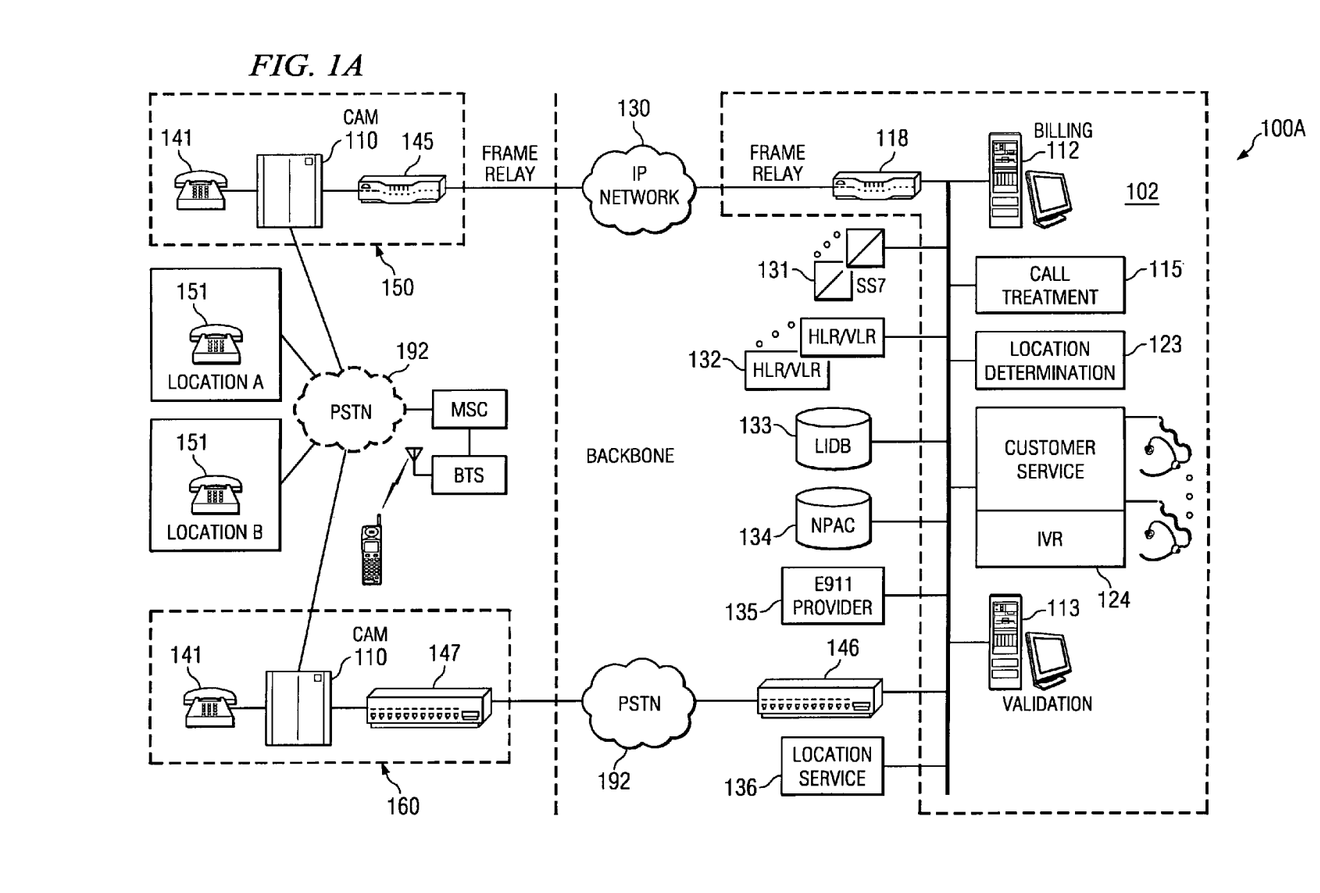
FIG. 1A shows a high level block diagram of a call processing system adapted according to an embodiment of the present invention.
Figure 1B:
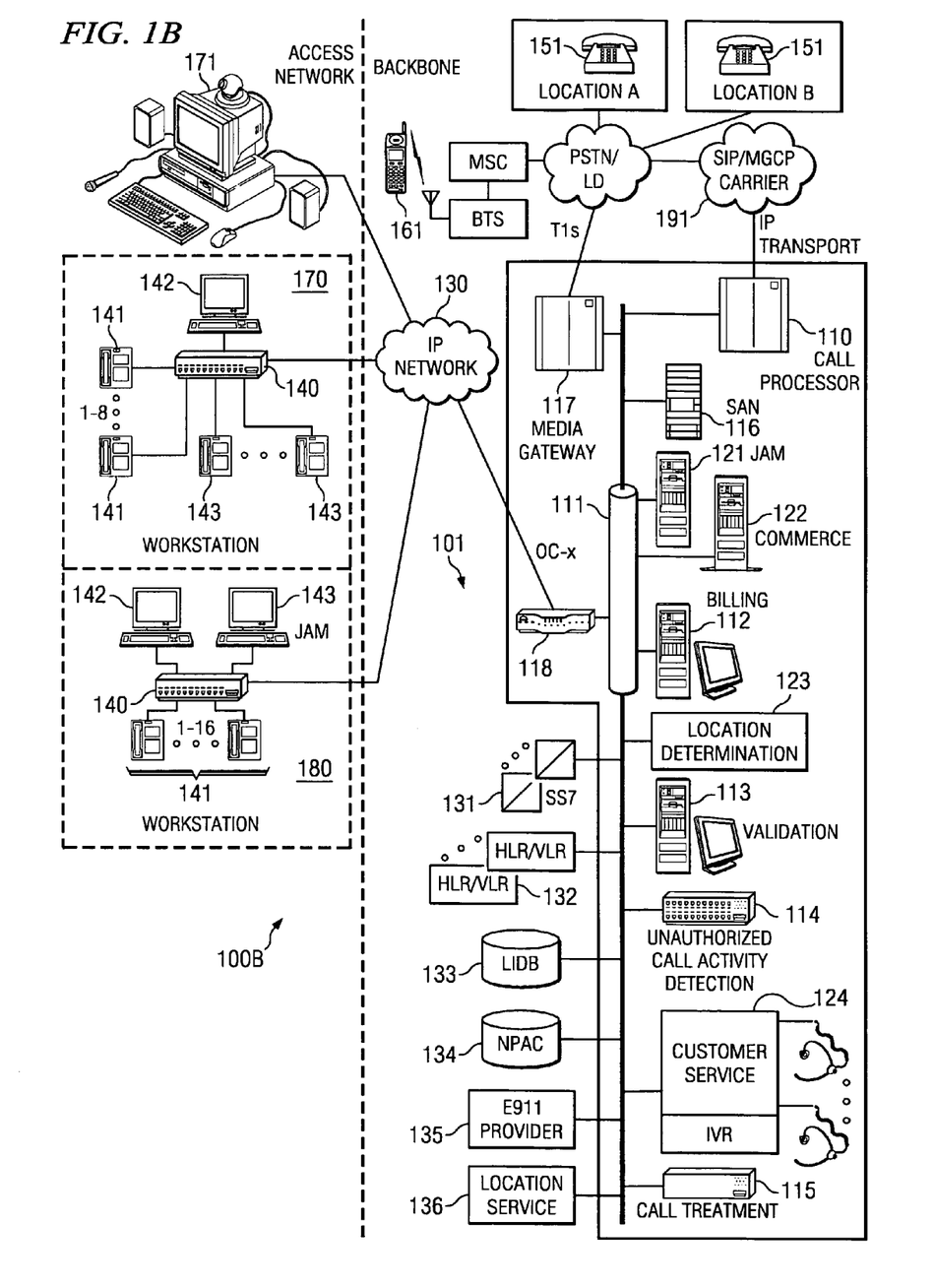
FIG. 1B shows a high level block diagram of a call processing system adapted according to another embodiment of the present invention.

Directing attention to FIGS. 1A and 1B, call processing systems configured according to embodiments of the present invention are shown. Specifically, a distributed configuration of a call processing platform useful in implementing embodiments of the present invention is shown in FIG. 1A as call processing platform 100A. Likewise, a centralized or net-centric configuration of a call processing platform useful in implementing embodiments of the present invention is shown in FIG. 1B as call processing platform 100B. Many of the components illustrated in FIGS. 1A and 1B perform substantially the same functions irrespective of the particular call processing system configuration and, therefore, are referenced herein using the same reference numeral. However, it should be appreciated that various alterations may be implemented with respect to any such component to accommodate a particular call processing system configuration.

To aid in understanding the concepts of the present invention, call processing systems 100A and 100B shall be described herein with reference to providing calling services with respect to prison facilities (e.g., a county jail, a state or federal prison, a military stockade, an internment camp, and/or the like). However, it shall be appreciated that the concepts of the present invention are not limited in applicability to the exemplary prison facilities and, therefore, call processing systems or portions thereof may be utilized with respect to any number of locations and/or facilities. For example, embodiments of the present invention may be utilized with respect to any number of controlled environment facilities other than a prison facility, such as hospitals, nursing homes, camps, dormitories, schools, etcetera. Additionally or alternatively, embodiments of the present invention may be utilized with respect to any number of locations, such as businesses, residences, kiosks, etcetera.

Referring now to FIG. 1A, call processing system 100A of the illustrated embodiment includes a plurality of user sites, here sites 150 and 160, for which calling services are to be provided. For example, calling services may be provided between any of user terminals 141 (shown as telephone terminals), user terminals 151, (shown as telephone terminals), and user terminals 161 (shown as wireless telephone terminals). Each of sites 150 and 160 include a call processing platform, shown here comprising call application manager (CAM) system 110, in communication with a validation/authorization service platform, shown as service platform 102, via networks 130 and 192. Service platform 102 and CAM systems 110 of the preferred embodiment may comprise one or more processor-based systems or servers, such as may comprise a computer having a processor, memory, and appropriate input and output interfaces and which are operable under control of an instruction set or instruction sets defining operation as described herein.

It should be appreciated that, although only a single service platform and two CAM systems are represented in FIG. 1A, any number of service platforms and CAM systems, perhaps having varied configurations and/or disposed at different geographic locations, may be implemented with respect to a call processing system of the present invention. Likewise, functionality as described herein with respect to the service platform and CAM system may be distributed differently than illustrated. For example, some or all of the functional aspects of service platform 102 of FIG. 1A may be disposed within CAM system 110 according to embodiments of the invention.

Embodiments of the invention dispose CAM system 110 local to a facility or location being provided calling services and provide the CAM system with substantial call control functionality, supplemented by centralized call validation, billing, etcetera by centralized service platform 102, wherein service platform 102 may provide similar services to a plurality of CAM systems. Further detail with respect to such a distributed call processing system configuration is provided in the above referenced patent application entitled "Information Management and Movement System and Method."

The embodiment illustrated in FIG. 1A includes network 130, such as may comprise a local area network (LAN), metropolitan area network (MAN), wide area network (WAN), an intranet, an extranet, the Internet, and/or combinations thereof, coupling service platform 102 and CAM system 110 of site 150 using corresponding ones of routers 118 and 145. Additionally, the embodiment of FIG. 1A includes network 192, such as may comprise the PSTN, coupling service platform 102 and CAM system 110 of site 160 using corresponding ones of modems 146 and 147. Communication via network 130 and network 192 between service platform 102 and CAM system 110 may include exchanges of call data to facilitate connection of calls between one or more of user terminals 141 and one or more of user terminals 151 and/or 161, as will be discussed in further detail below. The aforementioned call data may comprise such data as the identity of a calling party, a calling telephone identifier, a called telephone identifier, an account identifier, and/or the like, as may be communicated from CAM system 110 to service platform 102. The call data may additionally comprise such data as a validation acknowledgment or non-acknowledgement, an authorization to complete the call, an instruction to connect the calling and/or called party to a customer service system, a maximum permitted duration for the call, and/or the like, as may be communicated from service platform 102 to CAM system 110.

The illustrated embodiment of service platform 102 includes a number of functional aspects, ones of which may be omitted in optional configurations, shown as various systems cooperating to provide call processing according to embodiments of the present invention. Billing system 112, validation system 113, call treatment system 115, location determination system 123, and customer service system 124 may be utilized in various combinations to provide primary calling service functionality according to embodiments of the present invention. Service platform 102 may include additional or alternative functionality useful in providing calling services according to the present invention. Systems implementing examples of the foregoing are shown and described in the above referenced applications entitled "Information Management and Movement System and Method."

CAM systems 110 of the illustrated embodiment cooperate with billing system 112, validation system 113, call treatment system 115, location determination system 123, and customer service system 124 of service platform 101 in connecting calls from one or more of user terminals 141 with one or more of user terminals 151 and/or 161. Accordingly, the foregoing embodiment of call processing system 100A provides a distributed architecture in which call processing functionality is provided local with respect to locations for which calling services are provided, with validation and authentication services useful with respect to said call processing provided by a shared or centralized system (service platform 102). Alternative embodiments of the invention provide a robust centralized call processing platform, wherein the call processing platform may provide similar call control with respect to a plurality of facilities and/or locations, and a calling system disposed local to a facility or location which provides little call control functionality.

Referring now to FIG. 1B, call processing system 100B of the illustrated embodiment includes a plurality of user sites, here sites 170 and 180, for which calling services are to be provided. For example, calling services may be provided between any of user terminals 141 (shown as telephone terminals), user terminals 151, (shown as telephone terminals), user terminals 161 (shown as wireless telephone terminals), and user terminals 171 (shown as multi-media systems). Each of sites 170 and 180 include a call processing gateway, shown here comprising access devices 140, in communication with a call processing and validation/authorization service platform, shown as call processing platform 101, via network 130. Call processing platform 101 and access devices 140 of the preferred embodiment may comprise one or more processor-based systems or servers, such as may comprise a computer having a processor, memory, and appropriate input and output interfaces and which are operable under control of an instruction set or instruction sets defining operation as described herein.

It should be appreciated that, although only a single call processing platform and two call processing gateways are represented in FIG. 1B, any number of call processing platforms and call processing gateways, perhaps having varied configurations and/or disposed at different geographic locations, may be implemented with respect to a call processing system of the present invention. Likewise, functionality as described herein with respect to the call processing platform and call processing gateway may be distributed differently than illustrated.

Embodiments of the invention dispose access device 140 local to a facility or location being provided calling services and provide call processing platform 101 with substantial call control, call validation, treatment, and/or billing functionality, wherein call processing platform 101 may provide similar services to a plurality of call processing gateways. Accordingly, call processing system 100B illustrated in FIG. 1B provides a robust centralized call processing platform, wherein the call processing platform may provide similar call control with respect to a plurality of facilities and/or locations, and a call processing gateway disposed local to a facility or location which provides little call control functionality. Further detail with respect to such a centralized call processing system configuration is provided in the above referenced patent application entitled "Centralized Call Processing."

The embodiment illustrated in FIG. 1B includes network 130, such as may comprise a local area network (LAN), metropolitan area network (MAN), wide area network (WAN), an intranet, an extranet, the Internet, and/or combinations thereof, coupling call processing platform 101 and access devices 140. Communication via network 130 between call processing platform 101 and access devices 140 may include exchanges of call data to facilitate connection of calls between one or more of user terminals 141 and one or more of user terminals 151, 161, and 171, as will be discussed in further detail below. The aforementioned call data may comprise such data as the identity of a calling party, a calling telephone identifier, a called telephone identifier, an account identifier, and/or the like, as may be communicated from access device 140 to call processing platform 101. The call data may additionally comprise such data as an instruction to connect the calling and called parties, a maximum permitted duration for the call, and/or the like, as may be communicated from call processing platform 101 to access device 140.

In an embodiment wherein calls are placed on PSTN 192 by call processing platform 101, such as via media gateway 117, network 130 may provide packet switched links, such as those provided using various IP or frame relay protocols, for carrying voice signals, such as may comprise voice over Internet protocol (VoIP) packets. Embodiments of the present invention may utilize carrier access network and backbone network links implementing protocols such as Ethernet, asynchronous transfer mode (ATM), synchronous optical network (SONET), and the like.

The illustrated embodiment of call processing platform 101 includes a number of functional aspects, ones of which may be omitted in optional configurations, shown as various systems cooperating to provide call processing according to embodiments of the present invention. CAM system 110, billing system 112, validation system 113, call treatment system 115, media gateway 117, location determination system 123, and customer service system 124 may be utilized in various combinations to provide primary calling service functionality according to embodiments of the present invention. Call processing platform 101 may include additional or alternative functionality useful in providing calling services according to the present invention. For example, unauthorized call activity detection system 114, call recording system 116, and/or the like may be included in call processing platform 101, if desired. Systems implementing examples of the foregoing are shown and described in the above referenced applications entitled "Centralized Call Processing."

It should be appreciated that the functionality provided by call processing systems 100A and 100B is not limited to that described above according to embodiment of the invention. For example, enhanced functionality may be provided in embodiments including a justice application management system (shown as JAM system 121 in FIG. 1B), a commerce system (shown as commerce system 122 in FIG. 1B), and/or the like. The use of such enhanced functionality with respect to call processing systems is described in further detail in the above referenced patent applications entitled "Information Management and Movement System and Method" and "Centralized Call Processing."

Figure 2:
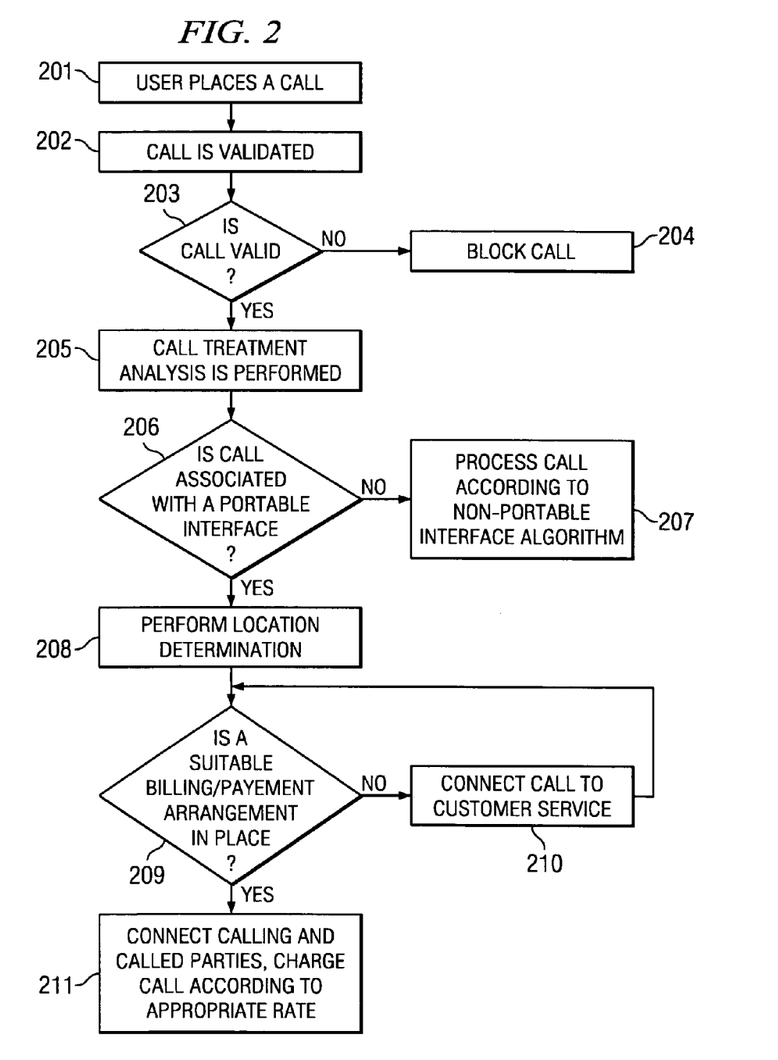
FIG. 2 shows a flow diagram of operation of the call processing systems of FIGS. 1A and 1B according to an embodiment of the present invention.

Operation of a call processing system, such as call processing systems 100A and 100B, according to a preferred embodiment is shown in the high level flow diagram of FIG. 2. The flow diagram of FIG. 2 begins with a user placing a call at block 201. For example, a prison inmate may utilize one of user terminals 141 and provide call information, such as a telephone number to which a call is to be placed, identification of the inmate (e.g., a personal identification number (PIN)), identification of an account to which the call is to be billed or an indication that the call is to be collect, and/or the like. Call information associated with the call being placed may be provided by access device 140 to call processing platform 101 via network 130. Similarly, call information associated with the call being placed may be provided by CAM system 110 to service platform 102.

The call is validated at block 202. For example, validation system 113 may verify the identity of the calling party, that the calling party is authorized to place a call, that the called party will receive calls or is authorized to receive calls from the calling party, that the calling party and/or called party have not exceeded a particular velocity of calls or a preselected value point (e.g., billing limit), that an identified prepaid account has sufficient monies to fund the call, that, in the case of a collect call, a billing arrangement exists between an entity responsible for billing calls to the called party and the calling service provider and that the called party presents an acceptable collection risk, etcetera. Detail with respect to call validation functionality is provided in the above referenced patent applications entitled "Information Management and Movement System and Method," "Optimizing Profitability in Business Transactions," "System and Methods for Offering a Service to a Party Associated with a Blocked Call," and "Systems and Methods for Transaction Authorization Determination."

If the call is determined not to be valid at block 203, processing according to the illustrated embodiment proceeds to block 204 wherein the call is blocked. Blocking of the call at block 204 may terminate the call attempt or may provide further processing, such as to attempt to facilitate a valid call. Systems and methods providing further processing with respect to a blocked call are shown and described in the above referenced patent application entitled "System and Methods for Offering a Service to a Party Associated with a Blocked Call."

According to preferred embodiments, validation system 113 cooperates with other systems to provide enhanced call validation. For example, validation system 113 of the illustrated embodiment cooperates with call treatment system 115 at block 205 to provide call intelligence for use in determinations with respect to allowing a particular call to be completed and/or continued. Accordingly, robust information, perhaps including information harvested from a signaling network, such as signaling system 7 (SS7) network 131, a database, such as line information database (LIDB) 133 and number portability administration center (NPAC) database 134, etcetera, may be utilized in call processing by call processing platform 101 or service platform 102 of embodiments. For example, determinations with respect to a called number being associated with a portable interface, such as a wireless telephone and/or a telephone for which LNP has been utilized, may be made from information available from SS7 data, LIDB data, and/or NPAC data and, thus, validation system 113 may utilize this information in a determination as to whether and how the call should be completed.

If, at block 206, it is determined that the call is not associated with a portable interface, e.g., the called party telephone is not a wireless telephone and is not a telephone for which LNP has been utilized, processing according to the illustrated embodiment proceeds to block 207 wherein the call is processed according to a non-portable interface algorithm. For example, call handling procedures and techniques addressing issues with respect to calls placed to a telephone utilizing a portable interface may not be invoked. Detail with respect to the treatment of calls to telephones not utilizing a portable interface is shown in the above referenced patent application entitled "System and Method for Call Treatment."

However, if it is determined at block 206 that the call is associated with a portable interface, processing according to the illustrated embodiment proceeds to block 208. It may be determined that a call is associated with a portable interface in a number of ways. For example, a LIDB query with respect to the called number may return a "203" code, indicating that the called user terminal is a wireless telephone. Additionally, a NPAC database query may identify the called user terminal is in the process of being ported or has been ported using LNP.

It should be appreciated that a called number may primarily be associated with an interface which is not portable, such as a wireline for which LNP has not been utilized, but which is temporarily associated with a portable interface. For example, using enhanced calling services, such as call forwarding, an individual may forward telephone calls directed to a home telephone number to a wireless telephone. Embodiments of the invention recognize such called numbers as being associated with a portable interface. For example, an intelligent network (e.g., SS7 network 131) query may be utilized to identify that call forwarding, or other enhanced calling features, have been invoked with respect to a called number. Detail with respect to identifying the use of such calling features and providing appropriate call processing in response thereto is shown in the above referenced patent application entitled "System and Method for Call Treatment."

At block 208 a location determination is performed, such as utilizing location determination system 123, to determine a location of the termination point of the call. Location determinations may be made using information available without setting up the call and/or using information available during or after setting up the call.

For example, location determination system 123 may make a commercial query to E911 provider system 135 or third party location service system 137 to determine the current location of user terminal 161 associated with a dialed number. Additionally or alternatively, location determination system 123 may query home location registers (HLR) and/or visiting location registers (VLR) to determine the current location of user terminal 161 associated with a called number. Similarly, location determination system 123 may query NPAC database 134 to obtain information useful in determining the location of a user terminal, such as any of user terminals 151 and 161, for which LNP has been utilized. Each of the forgoing location determination queries may be made without a call being set up with respect to the called number.

According to embodiments of the invention, location determination system 123 utilizes intelligent network (e.g., SS7 network 131) queries or other intelligent network signaling to determine a current location of a called user terminal. For example, intelligent network signaling may be utilized, such as when a call is set up, to determine the terminating switch in the call path (e.g., query the mobile switching center serving the wireless caller), and thus the general location of the called user terminal. The use of such signaling to provide location determinations may involve initiating a call path setup for location determination which is torn down before the call is actually connected, such as to allow further processing by a call processing system prior to connecting the call. Additionally or alternatively, such signaling may be utilized when the call is actually being connected or has been connected, such as to verify or confirm a location determination made through other means, such as using one of the techniques described above.

Although location determinations need not be made at the point in the flow diagram illustrated, embodiments of the present invention operate to provide location determination at a relatively early point in the call processing flow in order to have such information available for use in subsequent call processing operations. For example, where rating is based upon distance between the calling and called parties or otherwise affected by the location of the called party, such as to estimate the cost of a collect call to a called party before accepting the charges, to estimate if sufficient finds are present in a prepaid account, etcetera, location determinations may be made prior to rating operations. Likewise, where location of a called party is a factor in determining if a call should be completed, location determinations may be made prior to authorizing a call directed toward a telephone associated with a portable interface to be completed.

At block 209, a determination is made as to whether a billing and/or payment arrangement is in place which is suitable or acceptable for use in completing the call. For example, if a prepaid account has been identified by a calling or called party, a determination may be made as to whether this account contains sufficient funds to support the call for a reasonable time (e.g., an average call duration, a predetermined minimum call duration, this caller's and/or called's average call duration, etcetera). Similarly, if a call is to be post paid, such as a collect call where charges are reversed to the called party, a determination may be made as to whether a billing and collections relationship is in place between the carrier and the calling service provider operating the call processing system. Queries, such as those described above with respect to call validation and/or call treatment determinations, may be utilized to provide information with respect to account status, carrier identification, etcetera. For example, a LIDB query may provide information with respect to the carrier serving the called number.

Determinations with respect to the suitability and/or acceptability of particular billing and/or payment arrangements may be made, at least in part, based upon scoring of one or more of the parties to the call. For example, in operation according to one embodiment call treatment system 115 determines a called party score in a collect calling situation based upon information with respect to the called number (e.g., the length of time the number has been in service, past payment history associated with the number, the area in which the billing address is located, the area in which the telephone is located, etcetera) and utilizes that score in determining how the call should be treated (e.g., whether the call should be placed and/or what types of billing and/or payment arrangements should be accepted). Detail with respect to scoring parties to a call and using such scores in treating calls is provided in the above referenced patent applications entitled "Optimizing Profitability in Business Transactions" and "System and Method for Call Treatment."

Embodiments of the present invention operate to associate the foregoing scoring information with particular individuals or other entities despite their use of portable interfaces. For example, call treatment system 115 may identify telephone numbers that have been ported using LNP and attach information, such as billing history, usage history, billing name and address, ported billing telephone numbers, portability history, customer score and product eligibility, to the individual or other entity for the live of that individual or other entity.

Determinations with respect to the suitability and/or acceptability of particular billing and/or payment arrangements may be made based upon information in addition to or in the alternative to the above mentioned scoring of one or more of the parties to the call. For example, embodiments of the present invention may identify a called number that has been ported and use the port information in a determination as to how the call should be treated. According to one embodiment, when a called party has ported a billed telephone number from wireline to wireless, yielding LEC billing challenging, a call processing system may operate to block additional attempts by a calling party to connected to that called number. The called party may be contacted, such as by customer service system 124, or may contact the calling service provider to facilitate such calls, such as by establishing a prepaid account from which the cost of completed calls may be deducted. When a called party has ported a called number from wireless to wireline, embodiments of the present invention may operate to expand the called party's billing method eligibility (e.g., from being limited to prepaid to having the additional choices of LEC billed and/or direct billed). When a called party has ported a called number from wireless to wireless or wireline to wireline embodiments of the invention make any previous billing or payment methods available with respect to the new called number. Preferably, any of the above uses of LNP results in the called party's history being associated with the new called number.

If it is determined that a suitable or acceptable billing and/or payment arrangement is not in place with respect to the call, processing according to the illustrated embodiment proceeds to block 210 wherein the call is connected to customer service, such as may be provided by customer service system 124. After processing by customer service system 124, the illustrated embodiment proceeds again to block 209 wherein a determination is again made as to whether a billing and/or payment arrangement is in place which is suitable or acceptable for use in completing the call.

Customer service as provided at block 210 may comprise a live operator conversing with the calling and/or called party and/or automated interactive voice response (IVR) interaction with the calling and/or called party to facilitate completion of the call. For example, where an account associated with the calling party identified for use in placing the call is determined to contain insufficient funds, the calling party may be placed in communication with a live operator and/or an IVR unit to solicit funds, to obtain instructions regarding replenishing the account, or to otherwise establish a suitable payment or billing arrangement. Similarly, where an account associated with the called party or a third party is identified for use in placing the call is determined to contain insufficient funds, the called party or third party may be contacted (e.g., a call placed to the called number or a number identified with the account) and placed in communication with a live operator and/or an IVR unit to solicit funds or to otherwise establish a suitable payment or billing arrangement. Where the call is being placed as a collect call, the called party may be contacted (e.g., a call placed to the called party, perhaps blocking or isolating the calling party to prevent communications between the calling and called parties) and placed in communication with a live operator and/or an IVR to solicit acceptance of the charges, prepayment of the charges, or to establish a suitable billing arrangement.

Payments may be accepted in real time by customer service system 124 of preferred embodiments, such as through use of credit cards, debit cards, electronic checks, electronic commerce funds, etcetera. Postpaid billing accounts may be established in real time by customer service system 124 of embodiments of the invention through collection of appropriate information and risk scoring techniques, such as are shown and described in the above referenced patent application entitled "Optimizing Profitability in Business Transactions."

Where a party is placed in communication with customer service system 124 to solicit funds for a call or to accept charges for the call, it may be helpful to provide such a party with an estimate of the charges and/or the rate to be charged for the call. The foregoing location determination may be utilized according to embodiments of the invention in determining such rates and estimates, such as where rating is based on distance between calling and called parties or where called party location is otherwise a factor in rating. Customer service system 124 of embodiments of the invention provides the rating and/or charge estimate information to a party contacted regarding payment for the call. A party paying for the call may indicate that the charges will be accepted or otherwise paid if they do not exceed a particular limit. Accordingly, customer service system 124 may cooperate with validation system 113 and/or CAM system 110 to provide connection of the call up to a point at which the particular limit is reached.

If it is determined that a suitable or acceptable billing and/or payment arrangement is in place with respect to the call, processing according to the illustrated embodiment proceeds to block 211 wherein the call is connected between the calling and called parties and the call is charged at the appropriate rate. For example, billing system 112 may be provided with the rating information calculated above and may monitor the call, or otherwise be provided with call detail information (e.g., call detail records including call duration), to billing system 112 to provide accounting, billing, and/or reconciliation of charges for calling and other services provided by a call processing system.

Embodiments of the present invention may utilize one or more rating schemes of a variety schemes for rating a call. For example, where a called number has been determined to be associated with a wireless telephone, a rating scheme establishing rates on a factor or factors other than distance may be utilized. According to one embodiment, a flat rate is adopted with respect to wireless telephone calls. The aforementioned flat rate may be a rate per call, a rate per minute, and/or based upon additional or alternative call parameters. Of course, a flat rate tariff need not be applied only with respect to wireless telephone calls. Accordingly, embodiments of the present invention may apply the same or different flat rate schemes to wireless calls, calls to numbers for which LNP has been utilized, calls for which call forwarding has been implemented, and/or all calls.

Additionally or alternatively, rating may be based upon factors such as distance, as described above. Generally, rating based on distance is determined using NPA-NXX number analysis to identify a called party location and VH coordinates to determine "air mile" distance for rating. However, NPA-NXX number analysis may not be effective in determining distance with respect to wireless telephones and telephones for which LNP has been utilized. Accordingly, the aforementioned current location determinations may be utilized with VH coordinates to determine "air mile" distance to a current location for rating.

Location determinations made according to embodiments of the invention may be utilized for purposes in addition to or in the alternative to rating calls. For example, location determinations may be useful in providing investigative services, such as may be provided by the justice application management systems shown and described in the above referenced patent applications entitled "Information Management and Movement System and Method." This information may be provided to various entities, such as investigators associated with a prison facility using a call processing system, to provide insight into caller's activities, such as to determine to where an inmate is calling and associate that information with a crime having been committed or about to be committed.

It should be appreciated that, although the exemplary embodiment of FIG. 2 showing operation of call processing systems to process calls directed to telephones having a portable interface according to embodiments of the present invention has been described with respect to initiating a call, the concepts of the present invention are applicable to other stages of a call. For example, steps such as the foregoing may be implemented according to an embodiment to intervene in a call already in progress for the purpose of obtaining a method of payment. Such an embodiment may be particularly useful to facilitate a called party accepting an obligation to pay for the call and providing payment information.

Although embodiments have been described herein with reference to telephone calls, wireless telephones, and prison facilities, it should be appreciated that the concepts of the present invention are not limited to application in the particular examples given. For example, embodiments of the present invention may be utilized with respect to "calls" other than telephone calls, such as short message service (SMS), text messaging, electronic mail communications, pager messages, etcetera. Moreover, combinations of media types may be utilized according to embodiments of the present invention. For example, transmission of a SMS message may be utilized in providing location determination without setting up a call. Additionally or alternatively, a "blended" interface may be implemented, such as to use text messaging to contact a called party for collect call acceptance, to provide prepayment for a call, etcetera. Such messages may include information about the rate, who is calling, that the call is originating from within a prison facility or other controlled environment, instructions on how to block future calls, instructions on how to accept the call, instructions on how to prepay for this and/or subsequent calls, and/or the like.

Embodiments have been described herein with reference to user terminals which utilize portable interfaces. However, the call processing treatments described herein may be applied to calls placed with respect to any number of user terminals for which a calling service provider does not have a direct billing agreement. For example, embodiments of the present invention are utilized with respect to Internet phones (such as may be provided by user terminal 171), telephones served by a CLEC, etcetera.

Additionally, although embodiments have been described herein with reference to telephone terminals, it should be appreciated that any number of user terminal configurations may be utilized according to embodiments of the invention. For example, embodiments may utilize one or more user terminals of various configurations, such as pagers, personal digital assistants (PDAs), computers, and/or the like.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for processing calls comprising:
   determining if a call is directed to a user terminal implementing a portable interface, wherein said call is originated within a prison facility and said user terminal implementing said portable interface is disposed external to said prison facility;
   using a score associated with a party to the call to select a particular call payment method of call payment methods acceptable for use with respect to the call, wherein said call payment methods are determined as a function of a type of said portable interface;
   completing said call if the selected particular call payment method of call payment methods acceptable for said portable interface is implemented with respect to said call; and
   utilizing a call rating scheme selected for said portable interface to account for charges due under said call payment method.

2. The method of claim 1, wherein said portable interface comprises a wireless telephone interface and said user terminal comprises a wireless telephone.

3. The method of claim 1, wherein said portable interface comprises a telephone interface for which local number portability has been implemented.

4. The method of claim 1, further comprising:
   interacting with a party to said call to implement, in real-time, a call payment method of said call payment methods acceptable for said portable interface.

5. The method of claim 4, wherein said interacting with said party comprises:
   intervening in a call already in progress for the purpose of obtaining said call payment method.

6. The method of claim 4, wherein said interacting with said party comprises:
   placing said party in communication with a customer service representative.

7. The method of claim 4, wherein said interacting with said party comprises:
   placing said party in communication with an interactive voice response unit.

8. The method of claim 4, wherein interacting with said party comprises:

establishing a prepaid account by accepting payment from the group consisting of credit card payment, debit card payment, electronic check payment, and electronic commerce funds transfer.

9. The method of claim 4, wherein interacting with said party comprises:
providing an estimate of charges associated with said call.

10. The method of claim 4, wherein a combination of said interacting with said party and said call as completed utilize a multimedia interface.

11. The method of claim 10, wherein said interacting with said party comprises:
communicating textually with said party.

12. The method of claim 10, wherein said call as completed comprises:
a voice interface between two parties to the call, said two parties including said party.

13. The method of claim 1, wherein a particular said call payment method of said call payment methods acceptable for said portable interface is selected as a function of scoring at least one party to the call.

14. The method of claim 13, wherein information used with respect to said scoring is associated with an individual independent of a particular portable interface.

15. The method of claim 1, wherein said call rating scheme comprises a distance charge based upon a location determination made with respect to said user terminal.

16. The method of claim 1, wherein said call rating scheme comprises a flat charge based upon a type of said portable interface.

17. The method of claim 1, further comprising:
determining a current location of said user terminal implementing said portable interface.

18. The method of claim 17, wherein determining said current location comprises:
querying a location determination service provider.

19. The method of claim 18, wherein said location determination service provider comprises an E911 location service.

20. The method of claim 17, wherein determining said current location comprises:
querying an intelligent network for information with respect to particular network elements utilized with respect to said call.

21. The method of claim 20, wherein said intelligent network comprises a signaling system seven network.

22. The method of claim 17, wherein determining said current location comprises:
determining a location of a terminating switch utilized with respect to said call.

23. The method of claim 17, wherein determining said current location comprises:
querying at least one of a home location register and a visiting location register associated with said portable interface.

24. The method of claim 17, wherein determining said current location comprises:
querying a number portability administration center database.

25. The method of claim 17, wherein said current location is utilized in determining a rate for charging service with respect to said call.

26. The method of claim 17, further comprising:
determining if said current location is associated with a location for which calls are not authorized to be made;
blocking said call if said current location is a location for which calls are not authorized to be made.

27. The method of claim 17, further comprising:
using said current location for investigative analysis of a party to said call.

28. The method of claim 1 wherein said call payment method is a method for payment for said call by a called party.

29. A method for processing calls comprising:
determining if a call is directed to a user terminal implementing a portable interface;
using a score associated with a party to the call to select one or more particular call payment methods of call payment methods acceptable for use with respect to the call, wherein said call payment methods are determined as a function of a type of said portable interface;
completing said call if the particular call payment method of call payment methods acceptable for said portable interface is implemented with respect to said call, wherein said call payment methods acceptable for said portable interface are determined at least in part based upon a type of number portability utilized with respect to said portable interface; and
utilizing a call rating scheme selected for said portable interface to account for charges due under said call payment method.

30. The method of claim 29, wherein said type of number portability is selected from the group consisting of:
wireline to wireless;
wireless to wireline;
wireless to wireless;
wireline to wireline;
wireline to Internet protocol; and
Internet protocol to wireline.

31. A method for processing calls comprising:
identifying calls directed to user terminals implementing a portable interface, wherein said calls are originated within a prison facility and said user terminals implementing said portable interface are disposed external to said prison facility;
determining call payment methods for use with respect to said portable interface;
using a score associated with a party to the call to select one or more particular call payment methods of said call payment methods acceptable for use with respect to the call, wherein said call payment methods are determined as a function of a type of said portable interface; and
completing said call if at least one of said one or more particular call payment methods is implemented with respect to said call.

32. The method of claim 31, wherein said portable interface comprises a wireless telephone interface.

33. The method of claim 31, wherein said portable interface comprises a telephone interface for which number portability has been utilized.

34. The method of claim 31, further comprising:
interacting with a party to said call to implement a call payment method of said call payment methods at a point of demand for said call.

35. The method of claim 34, wherein interacting with said party comprises:
establishing a prepaid account by accepting payment from the group consisting of credit card payment, debit card payment, electronic check payment, and electronic commerce funds transfer.

36. The method of claim 34, wherein interacting with said party comprises:
establishing a post paid account by accepting billing information with respect to said party.

37. The method of claim 34, wherein interacting with said party comprises:
providing an estimate of charges associated with said call.

38. The method of claim 34, wherein said interacting with said party comprises:
communicating textually with said party.

39. The method of claim 31, further comprising:
utilizing a call rating scheme selected for said portable interface.

40. The method of claim 39, wherein said call rating scheme comprises a distance charge based upon a location determination made with respect to said user terminal.

41. The method of claim 39, wherein said call rating scheme comprises a flat charge based upon a type of said portable interface.

42. The method of claim 31, further comprising:
determining a current location of said user terminal implementing said portable interface.

43. The method of claim 42, wherein determining said current location comprises:
querying a location determination service provider.

44. The method of claim 43, wherein said location determination service provider comprises an E911 location service.

45. The method of claim 42, wherein determining said current location comprises:
querying an intelligent network for information with respect to particular network elements utilized with respect to said call.

46. The method of claim 45, wherein said intelligent network comprises a signaling system seven network.

47. The method of claim 42, wherein determining said current location comprises:
determining a location of a terminating switch utilized with respect to said call.

48. The method of claim 42, wherein determining said current location comprises:
querying at least one of a home location register and a visiting location register associated with said portable interface.

49. The method of claim 42, wherein determining said current location comprises:
querying a number portability administration center database.

50. The method of claim 42, wherein said current location is utilized in determining a rate for charging service with respect to said call.

51. The method of claim 42, further comprising:
determining if said current location is associated with a location for which calls are not authorized to be made;
blocking said call if said current location is a location for which calls are not authorized to be made.

52. The method of claim 42, further comprising:
using said current location for investigative analysis of a party to said call.

53. The method of claim 31 wherein said call payment methods comprise at least one method for payment by a called party.

54. A method for processing calls comprising:
identifying calls directed to user terminals implementing a portable interface;
determining call payment methods for use with respect to said portable interface;
using a score associated with a party to the call to select one or more particular call payment methods of said call payment methods acceptable for use with respect to the call, wherein said call payment methods are determined as a function of a type of said portable interface; and
completing said call if at least one of said one or more particular call payment methods is implemented with respect to said call.

55. The method of claim 54, wherein said call payment methods are further determined as a function of a type of number portability utilized with respect to said portable interface.

56. A call processing system comprising:
a call treatment processor-based system under control of an instruction set operable to determine if a call placed through said call processing system will terminate with a user terminal having a portable interface;
a validation processor-based system under control of an instruction set operable to determine if a payment method acceptable with respect to said portable interface is activated for use with respect to said call, wherein said payment method acceptable with respect to said portable interface comprises a method for payment by a called party, the validation engine using a score associated with a party to the call to select said payment method acceptable with respect to said call, wherein said call payment method is determined as a function of a type of said portable interface; and
a customer service processor-based system under control of an instruction set operable to establish a payment method acceptable with respect to said portable interface in real-time for use with respect to said call if said validation processor-based system determines that said payment method is not activated.

57. The system of claim 56, wherein a same computerized server comprises said call treatment processor-based system and said validation processor-based system.

58. The system of claim 57, wherein said computerized server further comprises said customer service processor-based system.

59. The system of claim 56, further comprising:
a location determination processor-based system under control of an instruction set operable to determine a current position with respect to said user terminal having a portable interface.

60. The system of claim 59, wherein said location determination processor-based system is coupled to a communication system intelligent network for use in determining said current position.

61. The system of claim 60, wherein said intelligent network comprises a signaling system seven network.

62. The system of claim 59, wherein said location determination processor-based system is coupled to a locator service system for use in determining said current position.

63. The system of claim 62, wherein said locator service comprises a 911 location service.

64. The system of claim 59, wherein said location determination processor-based system is coupled to at least one of a home location register and a visiting location register for use in determining said current position.

65. The system of claim 56, wherein said call treatment processor-based system is coupled to a communication system database for use in determining if said call will terminate with a user terminal having a portable interface.

66. The system of claim 65, wherein said communication system database comprises a line information database.

67. The system of claim 56, wherein said call treatment processor-based system is coupled to a number portability administration center database for use in determining if said call will terminate with a user terminal having a portable interface.

68. The system of claim 56, wherein said customer service processor-based system comprises an interactive voice response unit.

69. The system of claim 56, wherein said customer service processor-based system is coupled to a live operator for use in establishing said payment method.

70. The method of claim 56 wherein said method for payment by said called party comprises an account funded by said called party.

71. The method of claim 56 wherein said call is originated within a prison facility and said user terminal having said portable interface is disposed external to said prison facility.

72. A call processing system comprising:
  a call treatment processor-based system under control of an instruction set operable to determine if a call placed through said call processing system will terminate with a user terminal for which a service provider associated with said call treatment processor-based system has no direct billing agreement in place;
  a validation processor-based system under control of an instruction set operable to determine if a payment method acceptable with respect to said service provider is available for use with respect to said call, the validation processor-based system using a score associated with a party to the call to select one or more particular call payment methods of said call payment methods acceptable for use with respect to the call, wherein said call payment methods are determined as a function of a type of said portable interface;
  a customer service processor-based system under control of an instruction set operable to establish said payment method acceptable with respect to said service provider in real-time for use with respect to said call if said validation processor-based system determines that said payment method is available; and
  a location determination processor-based system under control of an instruction set operable to determine a current position with respect to said user terminal, wherein said validation processor-based system utilizes current position information from said location determination processor-based system in determining if a payment method acceptable with respect to said service provider is available for use with respect to said call.

73. The system of claim 72, wherein said user terminal utilizes a portable interface.

74. The system of claim 72, wherein said call treatment processor-based system is coupled to a communication system database for use in determining if said call will terminate with a user terminal having a portable interface.

75. The system of claim 72, wherein said call treatment processor-based system is coupled to a number portability administration center database for use in determining if said call will terminate with a user terminal having a portable interface.

76. The system of claim 72, wherein said location determination processor-based system is coupled to a communication system intelligent network for use in determining said current position.

77. The system of claim 72, wherein said location determination processor-based system is coupled to a locator service system for use in determining said current position.

78. The method of claim 72 wherein said call is originated within a prison facility.

* * * * *